(12) United States Patent
Scheffer et al.

(10) Patent No.: US 11,378,380 B2
(45) Date of Patent: Jul. 5, 2022

(54) ROTATIONAL ANGLE SENSOR HOLDING SYSTEM

(71) Applicant: Schwing GmbH, Herne (DE)

(72) Inventors: Heinrich Scheffer, Haltern am See (DE); Lisa Hauschild, Bochum (DE); Bernd Segschneider, Dortmund (DE)

(73) Assignee: SCHWING GMBH, Herne (DE)

( * ) Notice: Subject to any disclaimer, the term of this patent is extended or adjusted under 35 U.S.C. 154(b) by 366 days.

(21) Appl. No.: 16/603,120

(22) PCT Filed: Apr. 6, 2018

(86) PCT No.: PCT/EP2018/058887
§ 371 (c)(1),
(2) Date: Oct. 4, 2019

(87) PCT Pub. No.: WO2018/185299
PCT Pub. Date: Oct. 11, 2018

(65) Prior Publication Data
US 2020/0393235 A1    Dec. 17, 2020

(30) Foreign Application Priority Data

Apr. 6, 2017 (DE) .................... 10 2017 107 430.9
Nov. 17, 2017 (DE) .................... 20 2017 106 990.7

(51) Int. Cl.
*G01B 7/30* (2006.01)
*G01B 5/00* (2006.01)
(Continued)

(52) U.S. Cl.
CPC ............. *G01B 7/30* (2013.01); *G01B 5/0004* (2013.01); *G01B 5/24* (2013.01); *G01D 11/30* (2013.01)

(58) Field of Classification Search
None
See application file for complete search history.

(56) References Cited

U.S. PATENT DOCUMENTS 9,134,200 B2    9/2015  Waite et al.
2017/0059369 A1*  3/2017  Ootake .................... G01D 5/00

FOREIGN PATENT DOCUMENTS

DE    4216344 A1    11/1993
DE    19614818 A1    10/1997
(Continued)

OTHER PUBLICATIONS

International Preliminary Report on Patentability issued in PCT/EP2018/058887, dated Oct. 17, 2019, 15 pages.
(Continued)

*Primary Examiner* — Lisa M Caputo
*Assistant Examiner* — Nigel H Plumb
(74) *Attorney, Agent, or Firm* — Faegre Drinker Biddle & Reath LLP

(57) ABSTRACT

A retaining system for a rotation angle sensor assembly is disclosed. The retaining system includes a first retaining element for coupling to a first of two machine parts and comprising a rotation angle sensor of the rotation angle sensor assembly. The retaining system also includes a second retaining element for coupling to a second of the two machine parts and comprising at least one position encoder element of the rotation angle sensor assembly corresponding to the rotation angle sensor. The rotation angle sensor is configured to detect a rotation of the position encoder element relative to the rotation angle sensor. The first retaining element is configured to guide the rotation angle sensor via a guide positioned between the first retaining element and the second retaining element so as to be rotatable relative to the position encoder element on the second retaining element.

14 Claims, 15 Drawing Sheets

Figure 1:
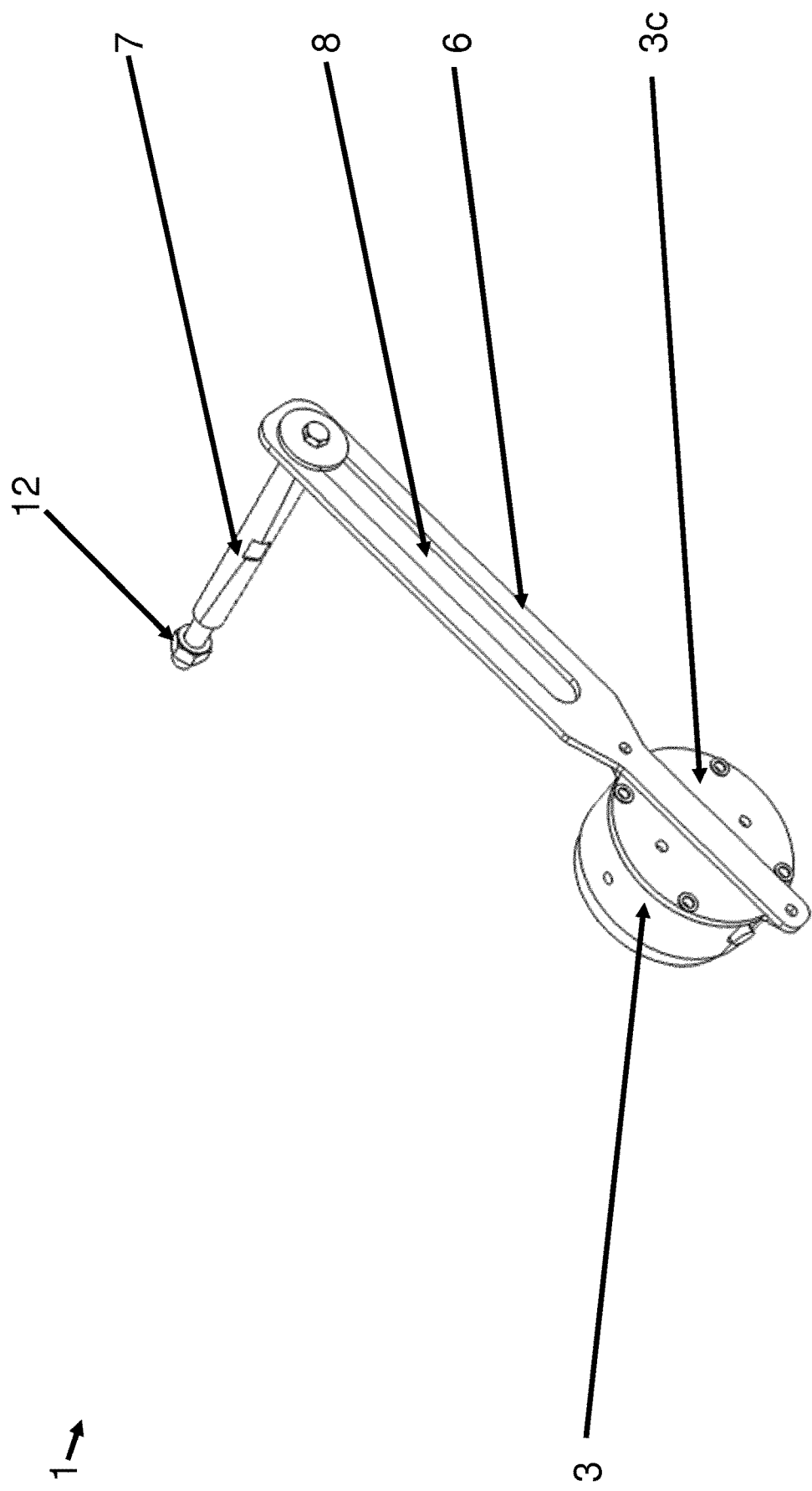

(51) Int. Cl.
    *G01B 5/24*     (2006.01)
    *G01D 11/30*     (2006.01)

(56) References Cited

FOREIGN PATENT DOCUMENTS

| | | |
|---|---|---|
| DE | 102006031718 A1 | 1/2008 |
| DE | 102007028265 A1 | 12/2008 |
| DE | 102014007071 A1 | 11/2015 |
| DE | 102014011078 B3 | 12/2015 |
| DE | 102015218425 A1 | 3/2016 |
| DE | 102015108473 A1 | 12/2016 |
| DE | 102016010052 A1 | 3/2017 |
| WO | 2016198376 A1 | 12/2016 |

OTHER PUBLICATIONS

International Search Report and Written Opinion issued in PCT/EP2018/058887 [with English translation], dated Jun. 22, 2018, 21 pages.

\* cited by examiner

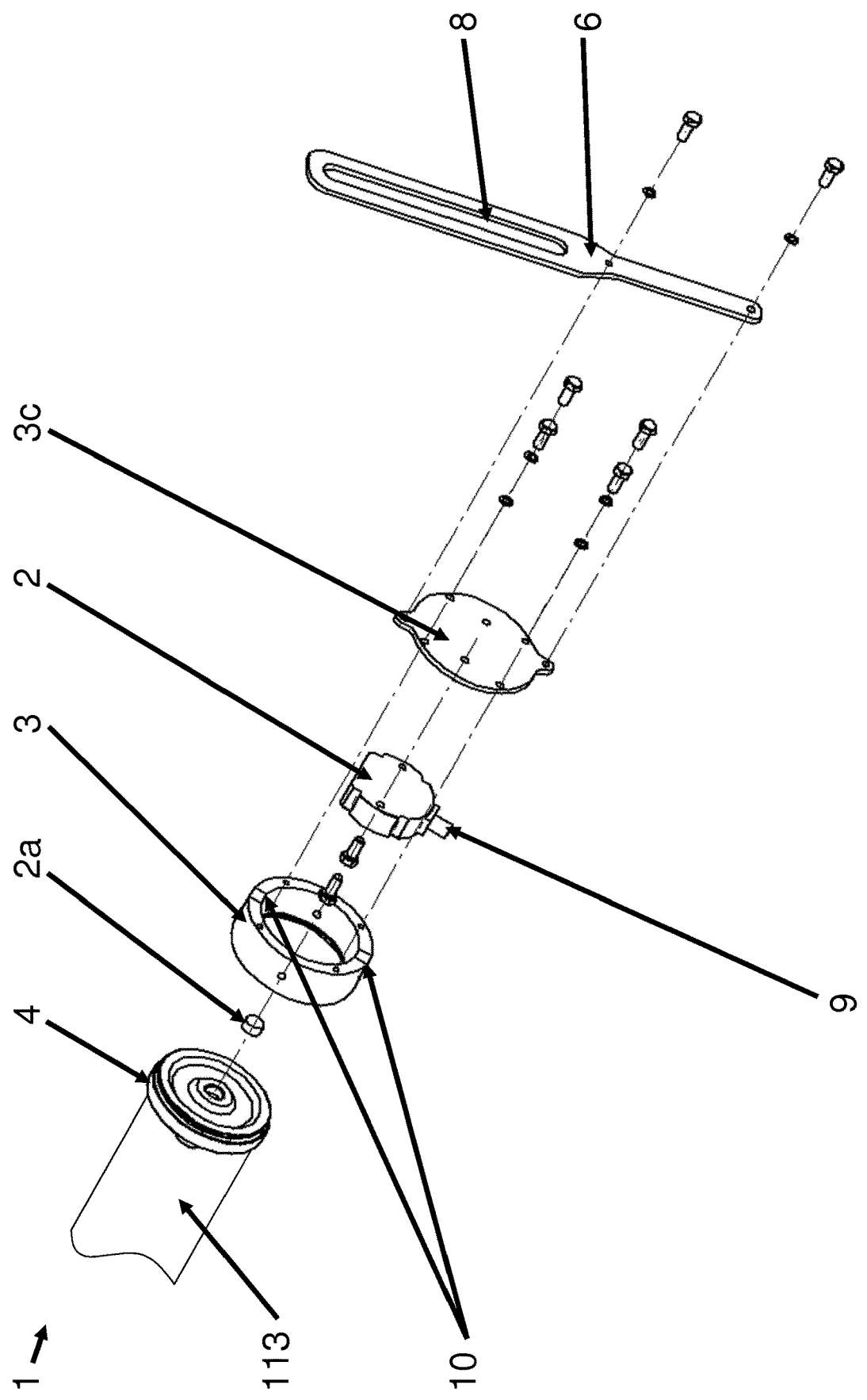

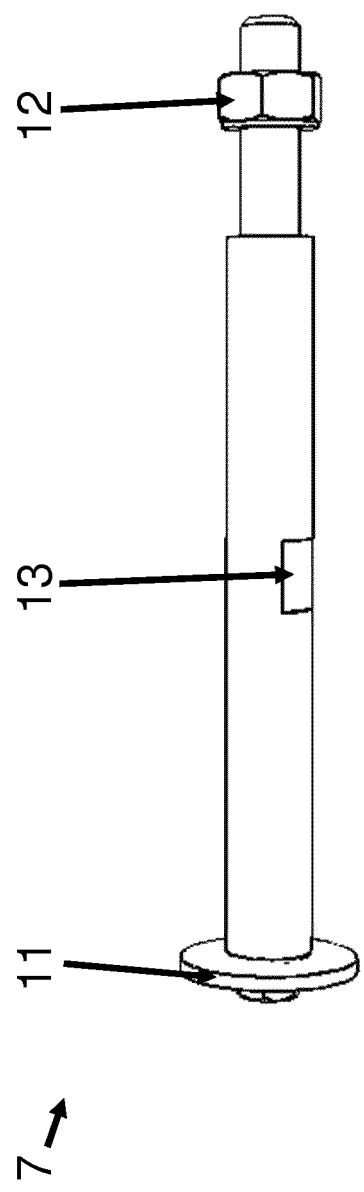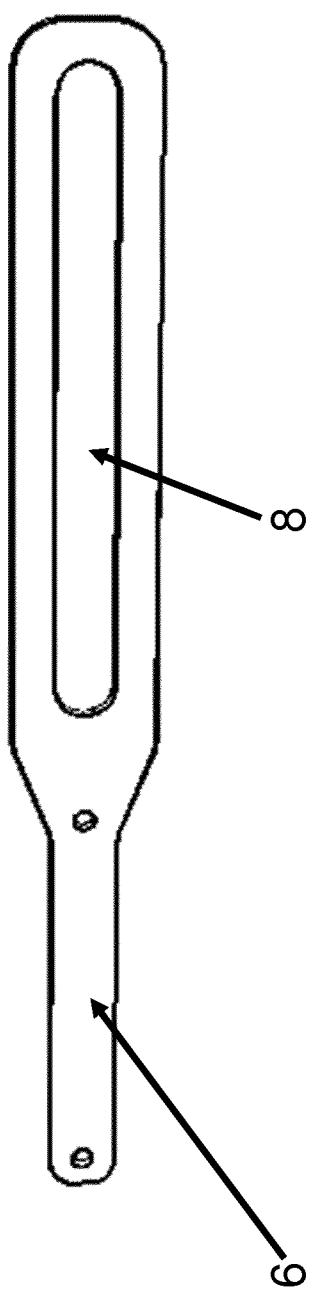
Fig. 3a
Fig. 3b

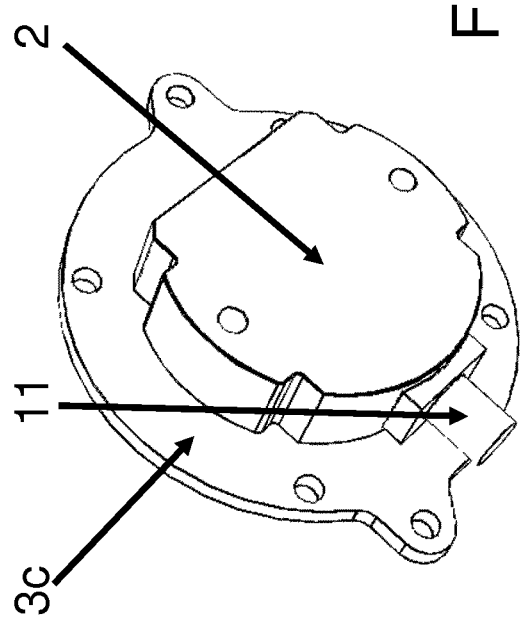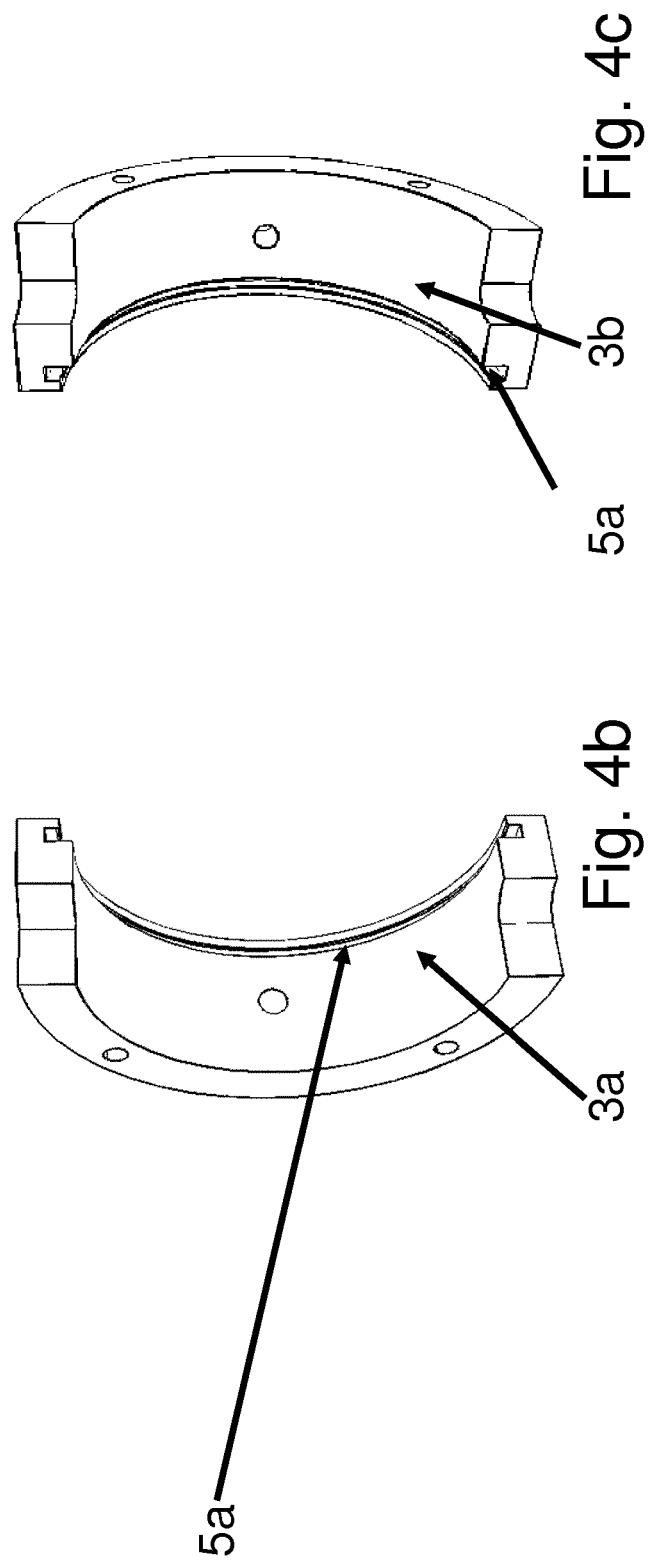

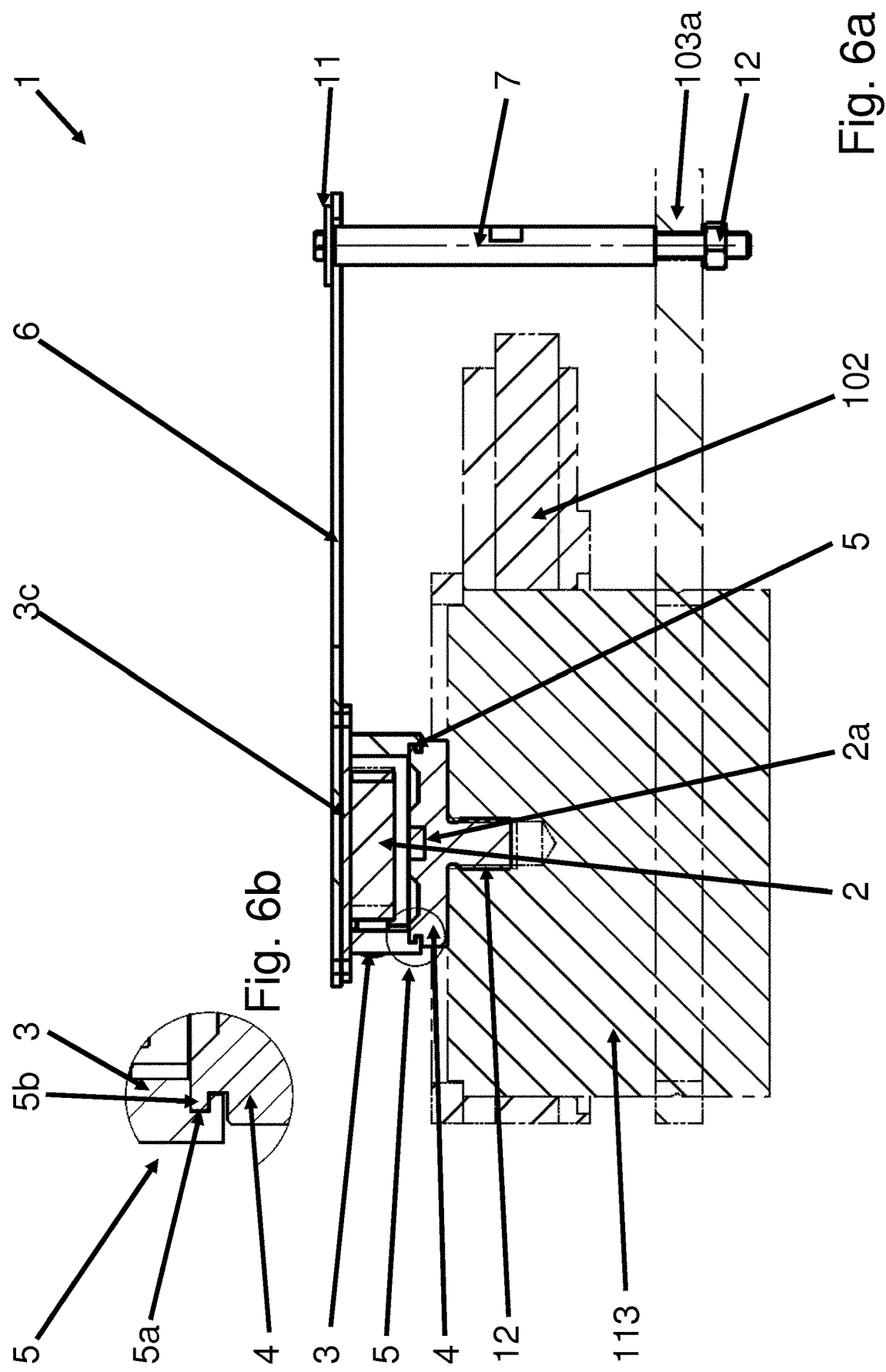

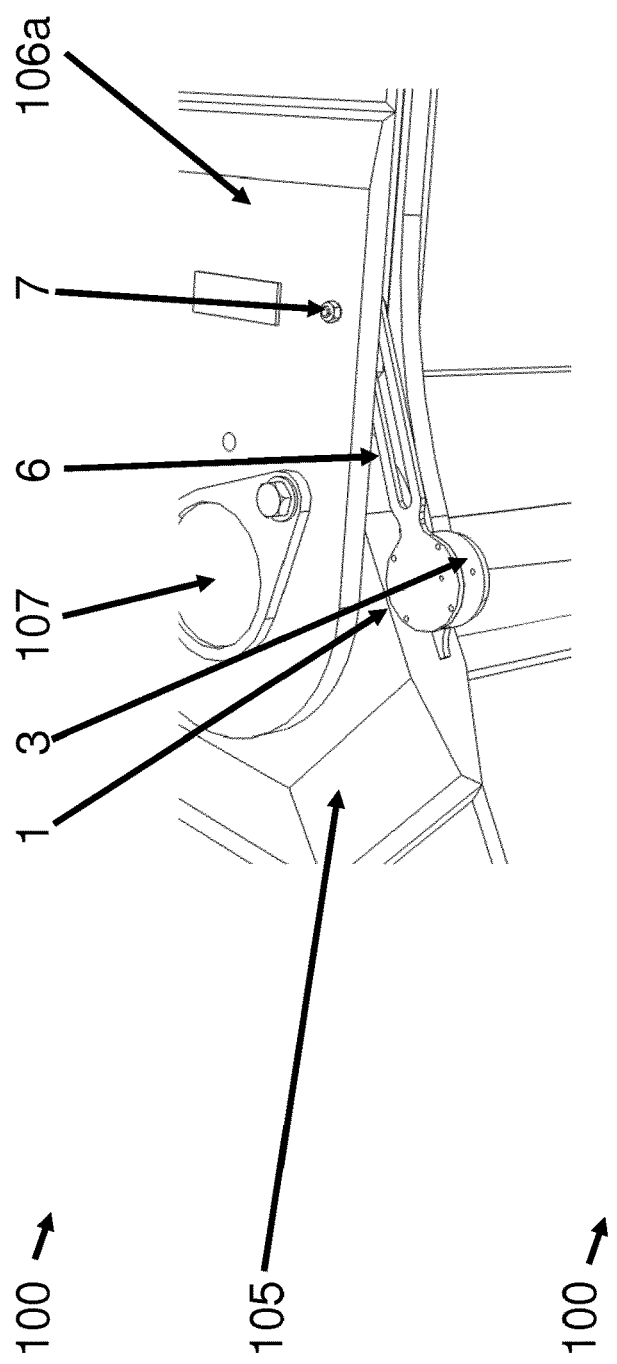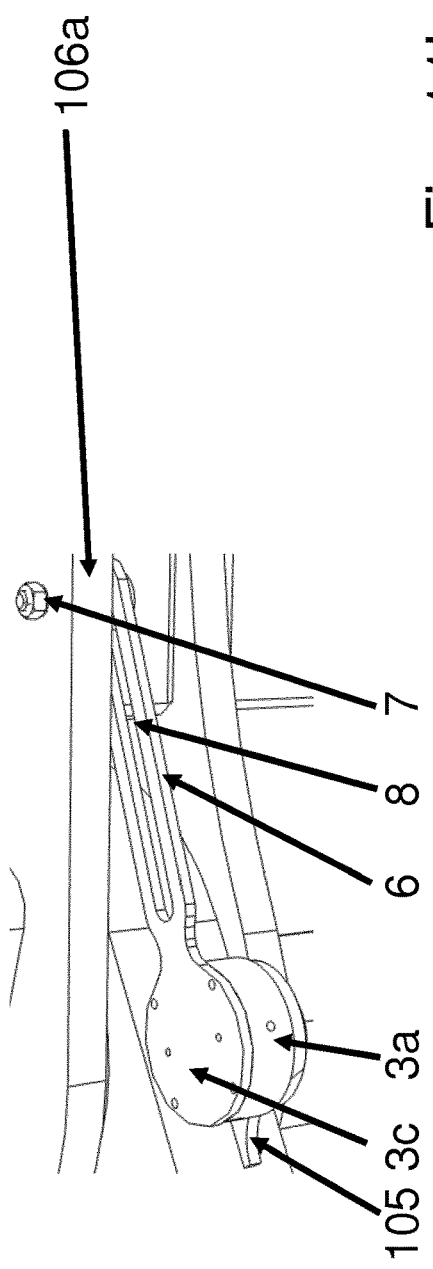
Fig. 11a
Fig. 11b

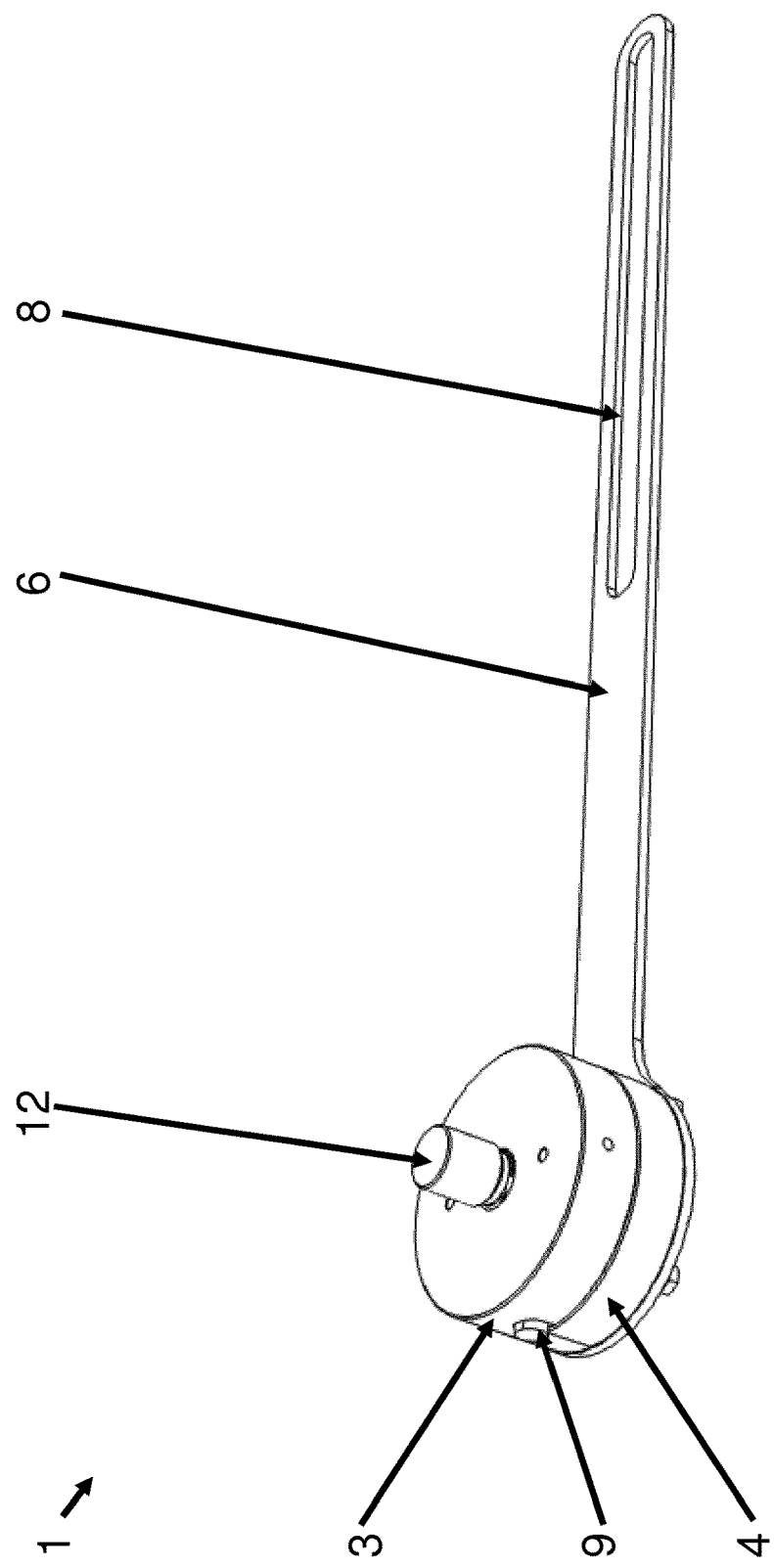

ROTATIONAL ANGLE SENSOR HOLDING SYSTEM

CROSS-REFERENCE TO RELATED APPLICATION

This application is a U.S. 371 National Stage Application of International Application No. PCT/EP2018/058887, filed Apr. 6, 2018, which claims the benefit of German Application No. DE 10 2017 107 430.9, filed Apr. 6, 2017, and German Application No. DE 20 2017 106 990.7, filed Nov. 17, 2017, all of which are herein incorporated by reference in their entireties.

The invention relates to a retaining system for a rotation angle sensor assembly to for retention on a work machine, wherein the rotation angle sensor assembly is designed for detecting an articulation angle at an articulated joint between two machine parts, comprising a first retaining element for coupling to a first machine part, wherein the retaining element comprises a rotation angle sensor of the rotation angle sensor assembly, a second retaining element for coupling is to a second machine part, wherein the second retaining element comprises at least one position encoder element of the rotation angle sensor assembly that corresponds to the rotation angle sensor, wherein the rotation angle sensor is designed to detect a rotation of the position encoder element relative to the rotation angle sensor.

In order to allow, for example, for reliable, simple and precise operation of a large manipulator that is designed as an articulated mast, the prior art proposes measuring the relative current articulation angle of the individual mast segments, in order to determine the folding state of the articulated mast, the damping of mast oscillations, the load moment device, or for coordinate control.

The articulation angle can be detected for example using mechanical rotation angle measuring systems. However, this is often too imprecise or too expensive. Articulation angle detection of this kind is difficult in particular if, in the case of a large manipulator comprising a thick matter pump, a thick matter delivery tube is guided through the articulated joints. Mechanical measurement using a rotation angle gauge is then possible only if additional mechanical deflection mechanisms are installed.

It is furthermore known, for the purpose of angle measurement, to measure the linear deflection of the drive units, by means of which the mast segments are pivoted relative to an adjacent segment or relative to the bogie in each case, and to then convert the measured deflection into the associated rotation angle of the joint. A disadvantage in this case, however, is that suitable measurement systems are complex and may require complete re-design/sizing of the drive units.

Furthermore, for detecting the articulation angle, angle sensors based on rotary potentiometers are known. The potentiometer measurement converts rotational movements into a resistance value and is advantageous in that an absolute value is available immediately after activation. A disadvantage in this case, however, is the mechanical wear. As a result of said wear, the resistance reduces over time, and the measurement results are consequently distorted. In measurements of this kind, it is also the case that only a very small mutual offset between the components can be tolerated.

DE 10 2014 007 071 A1 discloses a retaining system for a rotation angle sensor assembly of the type mentioned at the outset, for retention on a large manipulator. A disadvantage of the known retaining system is that the described angle plates for retaining the rotation angle sensor are difficult to position, because both the radial offset of the center axes and the spacing between the rotation angle sensor and the position encoder element have to be set very precisely. Furthermore, the retainer is very sensitive to impacts, as a result of which the retainer can be easily shifted or bent.

Furthermore, depending on the installation position on the work machine, different angle plates have to be provided, resulting in greater production outlay and storage costs when storing the different parts. Furthermore, for some installation situations it is difficult to provide a suitable angle plate at all. Moreover, accessible regions on the work machine are unsuitable for the describe angle plates, because the retainer and sensor may bend or be damaged by in appropriate stress.

Against this background, the object of the invention is that of providing an improved retaining system for a rotation angle sensor assembly. In particular, a retaining system for a rotation angle sensor assembly is to be specified, which system allows for simple and precise orientation of the sensor assembly (rotation angle sensor and position encoder element). The retaining system should furthermore be simple in design, universally usable, robust, and cost-effective to manufacture. For the precise orientation of the sensor assembly, in particular the axial orientation, the spacing, and the parallelism of the rotation angle sensor and of the position encoder element are the primary considerations.

This object is achieved by the invention, proceeding from a retaining system of the type mentioned at the outset, in that the first retaining element guides the rotation angle sensor by means of a guide between the first retaining element and the second retaining element, so as to be rotatable relative to the position encoder element on the second retaining element.

A guide of this kind ensures the precise orientation of the sensor assembly. In particular the axial orientation, but also the spacing, as well as the parallelism of the rotation angle sensor and of the position encoder element are ensured by the guide between the first retaining element and the second retaining element. The guide between the first and the second retaining element makes it possible to ensure a defined spacing between the rotation angle sensor and the position encoder element. Said spacing between the rotation angle sensor and the position encoder element is preferably 1 to 9 mm, more preferably 4.5 mm. It is thus possible to ensure precise orientation of the sensor assembly in a simple manner. The retaining system according to the invention is also very simple in design and can be used universally. The guide according to the invention makes the retaining system robust, and cost-effective to manufacture.

Advantageous embodiments and developments of the invention can be found in the dependent claims.

According to an advantageous embodiment of the invention, one of the two retaining elements comprises a groove as a guide, while the other retaining element comprises, as a guide, at least one projection that engages in the groove. Forming a groove as a guide in one of the retaining elements, and providing at least one projection that engages in the groove, is a simple possibility for forming a precise and reliable guide between the two retaining elements. The projection may be designed as a spring, hub or collar.

According to an advantageous embodiment, one of the two retaining elements comprises at least two retaining element parts which can be arranged on the other retaining element and surround the last retaining element in an interlocking manner. The multi-part design of one retaining element facilitates assembly on the other retaining element, such that an interlocking connection between the retaining elements can be produced in a simple and reliable manner upon assembly.

According to a preferred embodiment, the retaining element parts are designed as half shells. Designing the retaining element parts as half shells provides the possibility of simple assembly of as few parts as possible, in order to establish a robust guide between the retaining elements.

According to a further preferred variant, one of the two retaining elements is connected to a driver lever. The driver lever, arranged on one retaining element, makes it possible for a rotational movement of the machine part to be transferred easily to the retaining element, such that the position for arranging the retaining system can be selected in a flexible manner.

The development in which the driver lever comprises a slot is particularly advantageous. Forming a slot on the driver lever is a simple possibility for reliably guiding a fastening element, for coupling the driver lever to a machine part, on the driver lever. In this way, varying spacings between the retaining element and fastening element can be compensated by means of the rotational movement of the machine parts relative to one another.

A further advantageous embodiment is one in which a driver pin is guided in the slot on the driver lever, wherein the driver pin can be coupled to the two machine parts. As a result, the retaining system does not necessarily need to be mounted directly on a joint shaft between the two machine parts but can instead also be mounted in a suitable region of the joint. Owing to the guidance of the driver pin in the driver lever, changes in spacing between a retaining element and the driver pin, which result according to the manner of installation, during the rotational movement of the machine parts relative to one another, can be compensated by the slot.

According to an advantageous embodiment of the invention, the rotation angle sensor is designed so as to perform the detection in a contactless manner. This allows for precise, cost-effective and long-lasting rotation angle measurement between two machine parts that are pivotable relative to one another. The mechanical separation of the sensor assembly not only prevents mechanical wear, but furthermore the contactless angle measurement allows for certain tolerances between the retaining elements without said tolerances having a negative effect on the measured values.

According to a preferred embodiment, the rotation angle sensor is designed as a Hall sensor, and the at least one corresponding position encoder element is designed as a magnet. Depending on the position of the position encoder element relative to the rotation angle sensor designed as a Hall sensor, the magnetic field generated by the magnet generates a magnetic flux through the rotation angle sensor, and thus a corresponding electrical signal at the output thereof. Using a Hall sensor makes it possible to ensure a high degree of measuring accuracy by the rotation angle sensor assembly, even in harsh surroundings, such as moisture, dust or vibrations. Use is also possible in the case of restricted installation conditions, owing to the very compact dimensions. Furthermore, a certain offset or a certain change in spacing between the position encoder element and the rotation angle sensor can be tolerated without the measured values being distorted. Overall, the sensor assembly can ensure very precise and long-lasting angle measurement.

The invention furthermore relates to a work machine, wherein the working machine, described in greater detail above and in the following, comprises at least one retaining system according to the above and following description. The work machine according to the invention comprises at least two machine parts that are pivotable relative to one another and the articulation angle of which, relative to one another, is detected by the rotation angle sensor assembly. Said work machine may be designed as a large manipulator or as another construction machine such as a digger, bulldozer, wheel loader, forklift, or dumper. In the case of a digger, it is possible, for example, for the excavation depth to be set automatically and checked by the rotation angle sensor assembly. In the case of a bulldozer, for example the height of the bulldozer blade can be maintained easily by the rotation angle sensor assembly that is retained securely by the retaining system.

A preferred embodiment of the work machine provides for a fold-out articulated mast which comprises a bogie that is rotatable about a vertical axis, and a plurality of mast segments, wherein the mast segments are pivotably connected to the adjacent mast segment or bogie in each case, by means of articulated joints, wherein the at least one retaining system comprises a rotation angle sensor assembly for detecting an articulation angle between two adjacent mast segments or between one mast segment and the adjacent bogie. Arranging a retaining system comprising a rotation angle sensor assembly in the region of the articulated joint between two mast segments or between one mast segment and the adjacent bogie makes is possible to determine the movements of the articulated mast more reliably and in an error-free manner, using the securely and robustly positioned rotation angle sensor assembly, by means of faultless detection of the articulation angle between adjacent mast segments or between one mast segment and the adjacent bogie.

In a further preferred variant of the work machine, a chassis and a plurality of supporting side arms are provided, which side arms are each arranged on the chassis and can be folded out fully or in part, by means of an articulated joint, from a travel position into a support position, wherein the supporting side arms are designed to support the movable work machine relative to the ground, in a support position, wherein the at least one retaining system comprises a rotation angle sensor assembly for detecting an articulation angle between a supporting side arm and the chassis.

Arranging a retaining system comprising a rotation angle sensor assembly in the region of the articulated joint, between the chassis and a supporting side arm, makes it possible to detect the opening angle of the supporting side arm in a reliable and error-free manner, for example in order to set an opening angle of the supporting side arm defined for partial support, or in order to detect the fold-out angle of the supporting side arm for checking the stability.

The support by the supporting side arm carries away the tilting moment over a larger footprint of the work machine, and thus prevents shifting of the chassis. This is of particular importance for allowing for reliable, simple and precise operation of a large manipulator on the chassis. For this purpose, the swivel angles of the supports, in particular of the supporting side arms, are preferably detected. It is thus possible to ensure, inter alia, that the supports have also actually been extended as far as the desired deflection, before beginning to fold out the articulated mast. Furthermore, it is possible to determine splay angles of supporting side arms that are extended only in part, in order to restrict the working range of the articulated mast on the basis of this information, because, in the case of supporting side arms that are extended only in part, it is generally not possible to reliably use the entire working range of an articulated mast. The swivel angles of the supporting side arms, which are designed for example as folding supports, can advantageously be detected by means of the rotation angle sensor assembly described above and in the following.

In an advantageous embodiment of the work machine, a retaining system is coupled in such a way that the rotation angle sensor assembly detects the articulation angle between two machine parts. In particular, detecting the articulation angle between two machine parts by arranging the rotation angle sensor assembly directly on an articulation axle between two adjacent machine parts provides the advantage that it is not necessary to convert the determination of the articulation angle between the machine parts.

In a preferred embodiment of the work machine, a retaining system is coupled in such a way that the rotation angle sensor assembly detects the articulation angle at a hinge point to which kinematics elements in the form of drive and coupling members formed of the group of hydraulic cylinders, push rods and deflection levers are hinged, and is designed to convert the absolute articulation angle between two machine parts. If a direct angle measurement on the articulation axle between the machine parts is not possible, because, for example in the case of a concrete pump, a delivery tube is guided through the articulated joint, it is possible to determine the rotational movement at one of the hinge points of the drive and coupling members and to convert said movement into the absolute articulation angle of the articulated joint. For example, in the case of an articulated mast, the hinge points are the points at which the drive units are connected to the bogie or the mast segments. The drive units are arranged so as to be pivotable relative to the bogie or to the mast segments. In order to measure the rotational movement at a hinge point, one element of the rotation angle sensor assembly, for example the rotation angle sensor, can be rotationally fixed to the drive unit, and the other element of the rotation angle sensor assembly, i.e. the position encoder element, for example the at least one magnet, can be rotationally fixed to the bogie or one of the mast segments. Advantageously, hydraulic cylinders are used as drive units.

A further preferred variant of the work machine provides for a thick matter pump, in particular a concrete pump, that is arranged on the work machine.

Figure 5C:
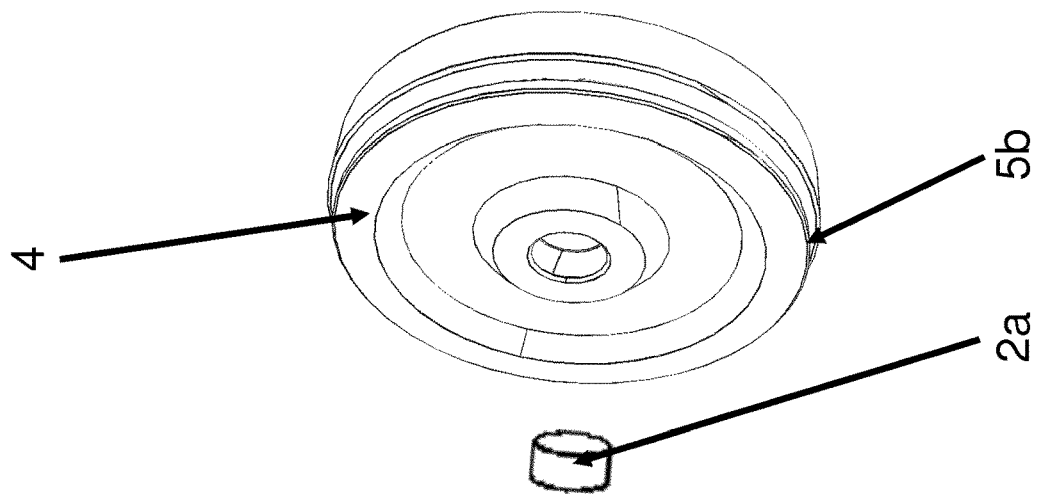
Figure 5B:
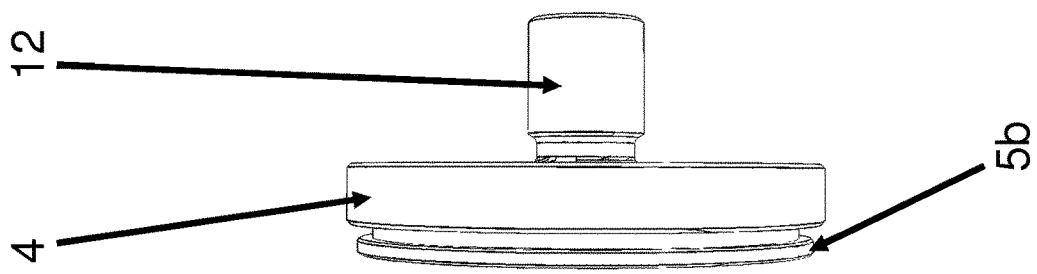
Figure 5A:
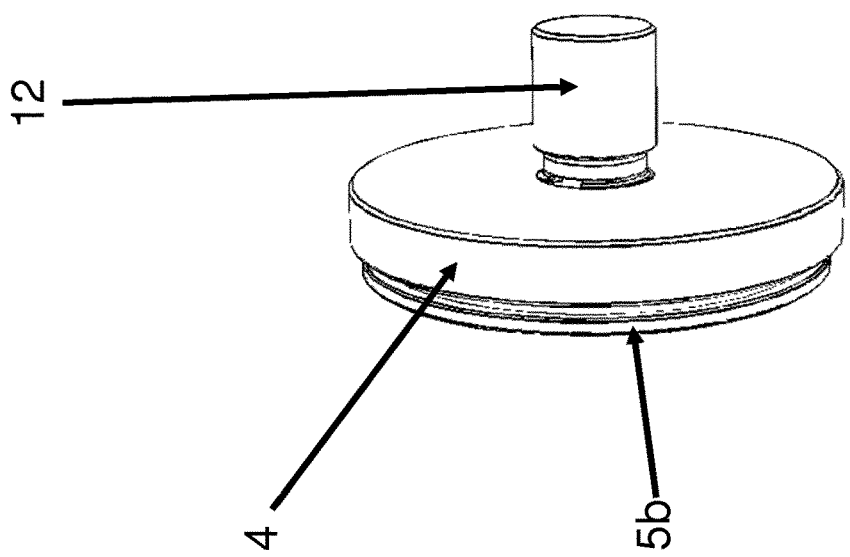
Figure 7:
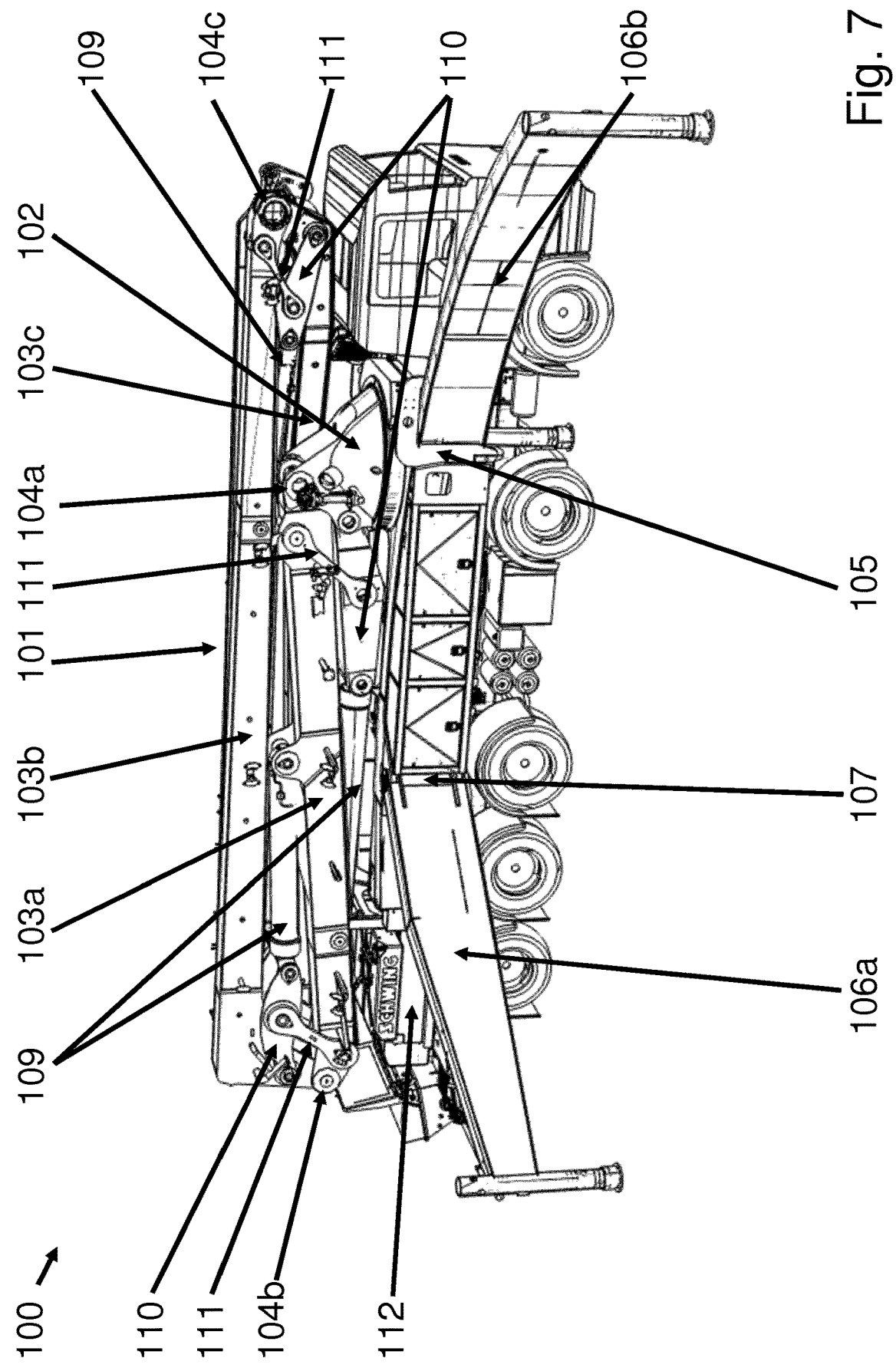
Figure 8:
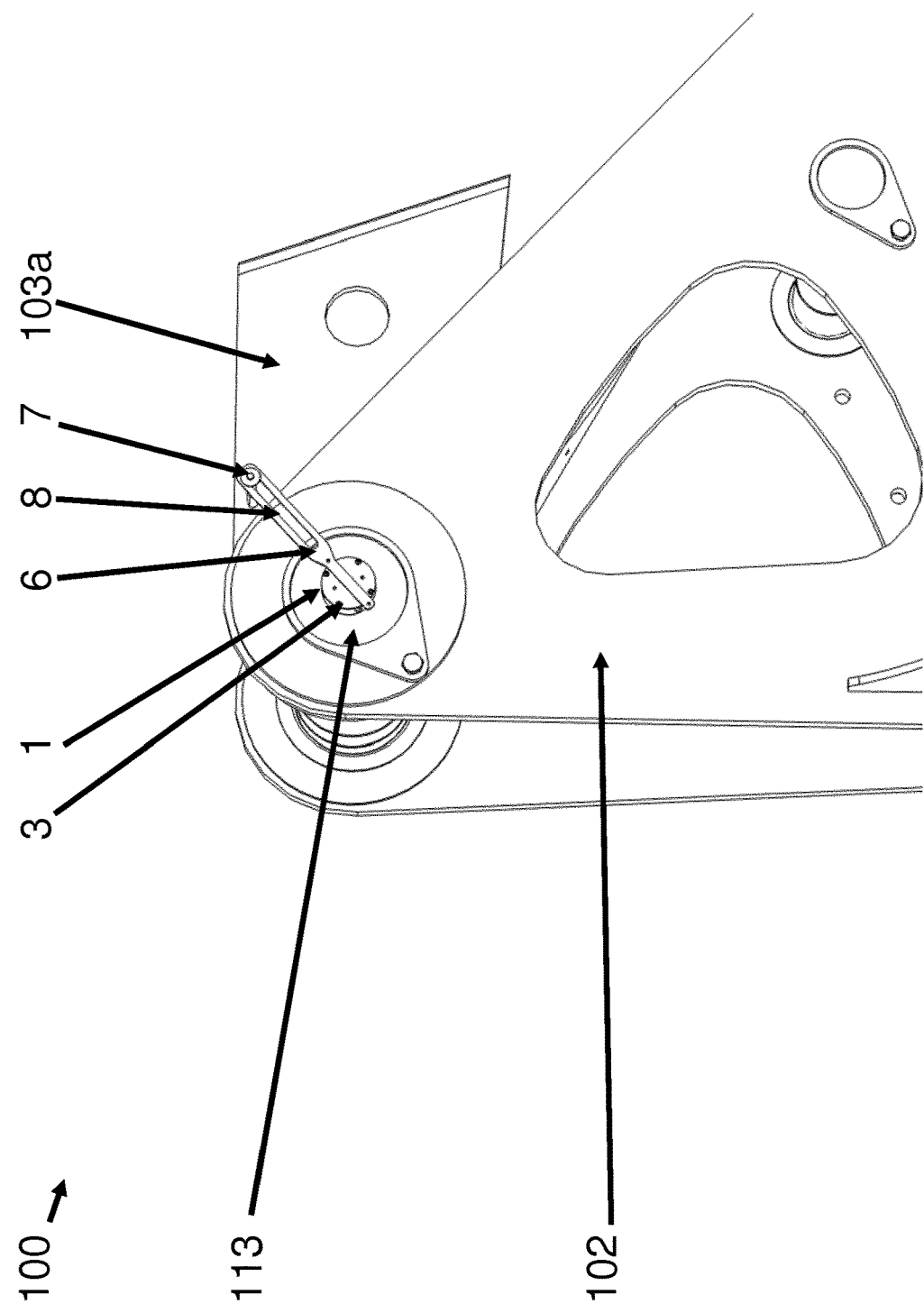
Figure 9:
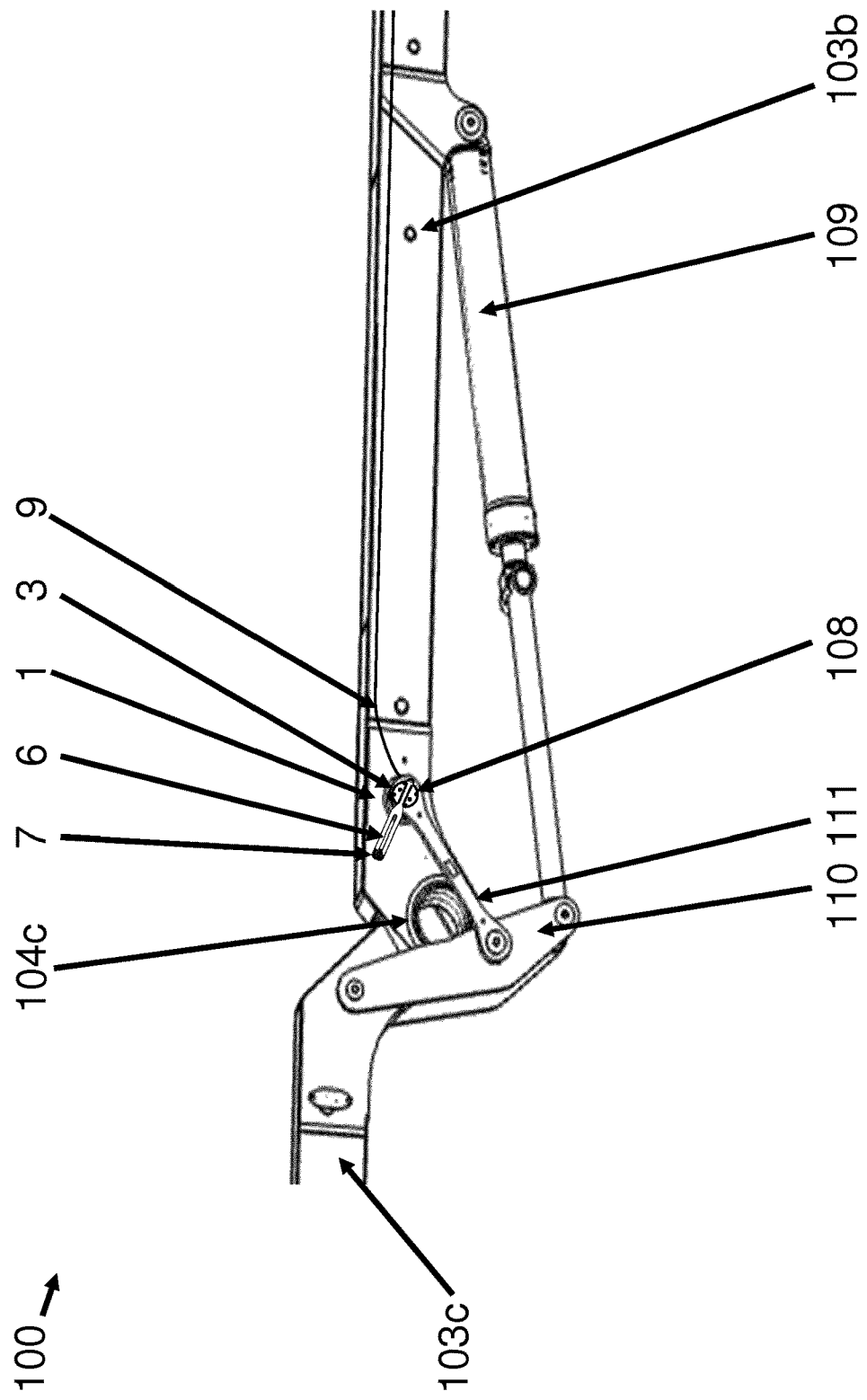
Figure 10:
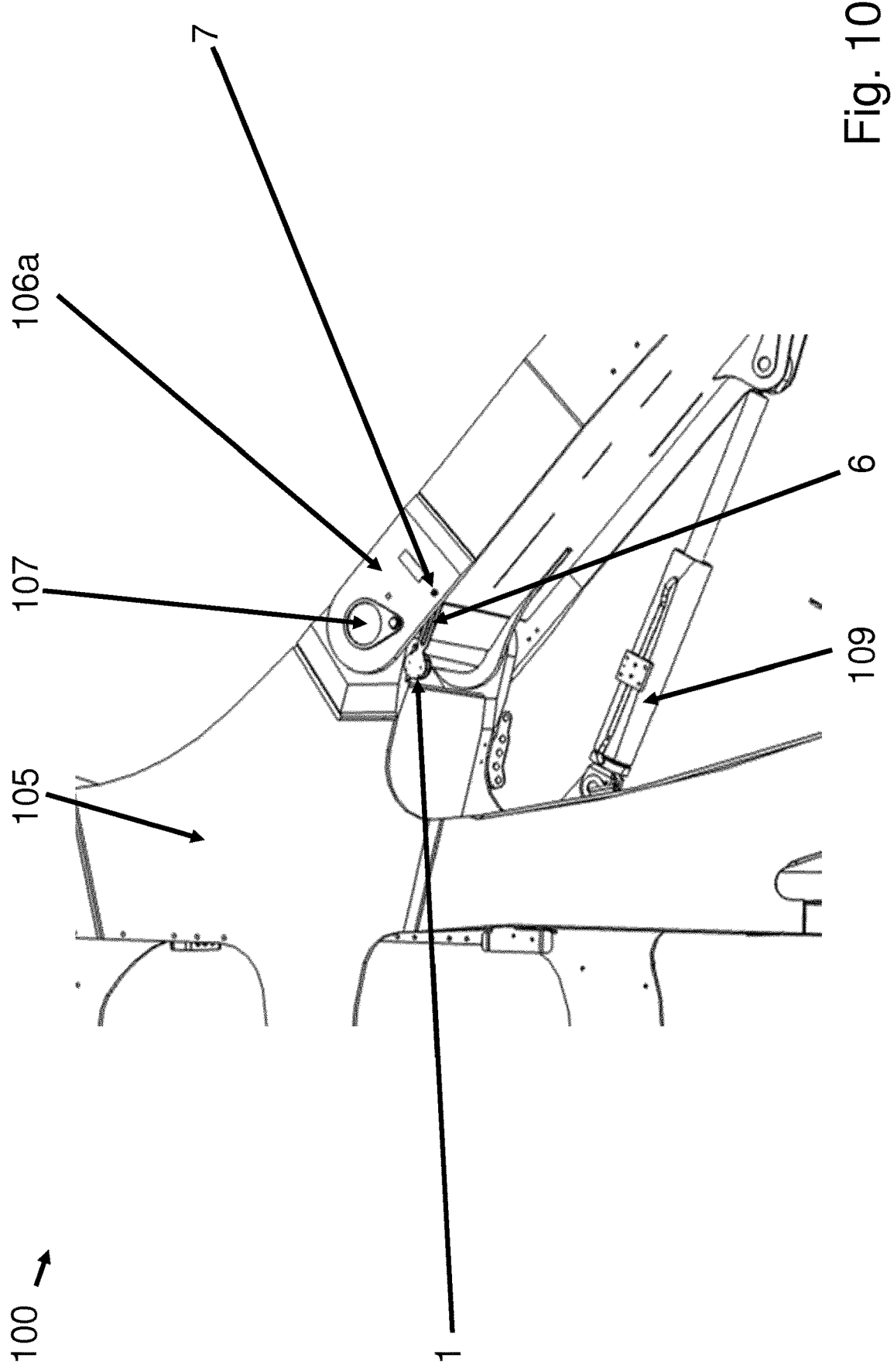
Figure 12A:
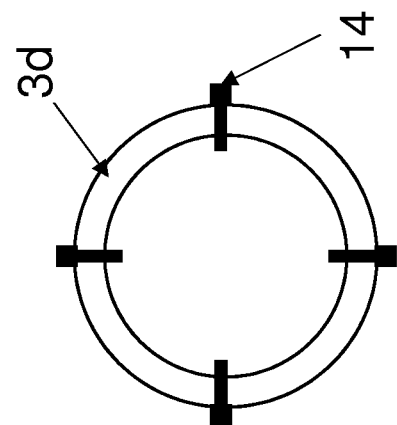
Figure 14:
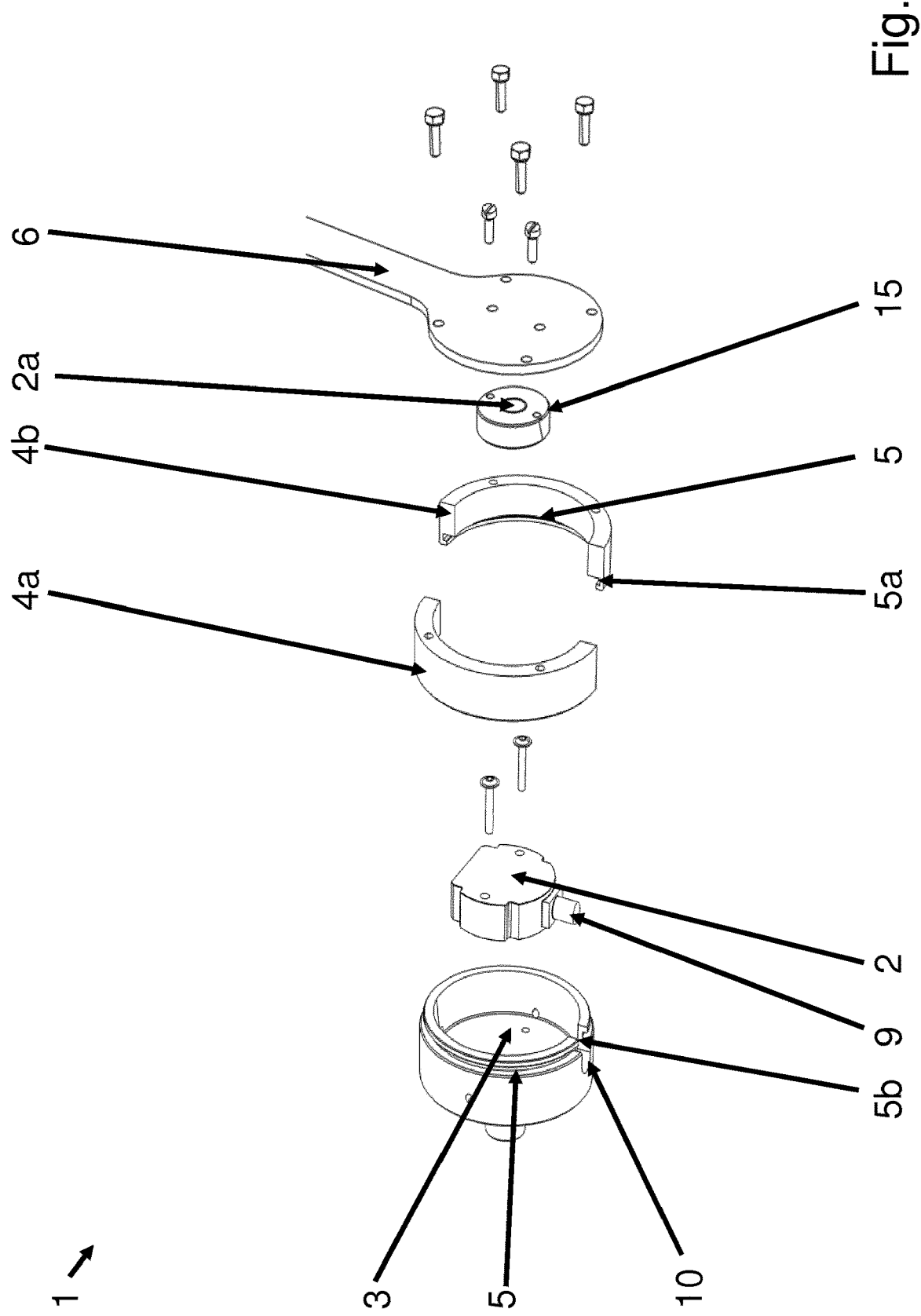
Figure 15:
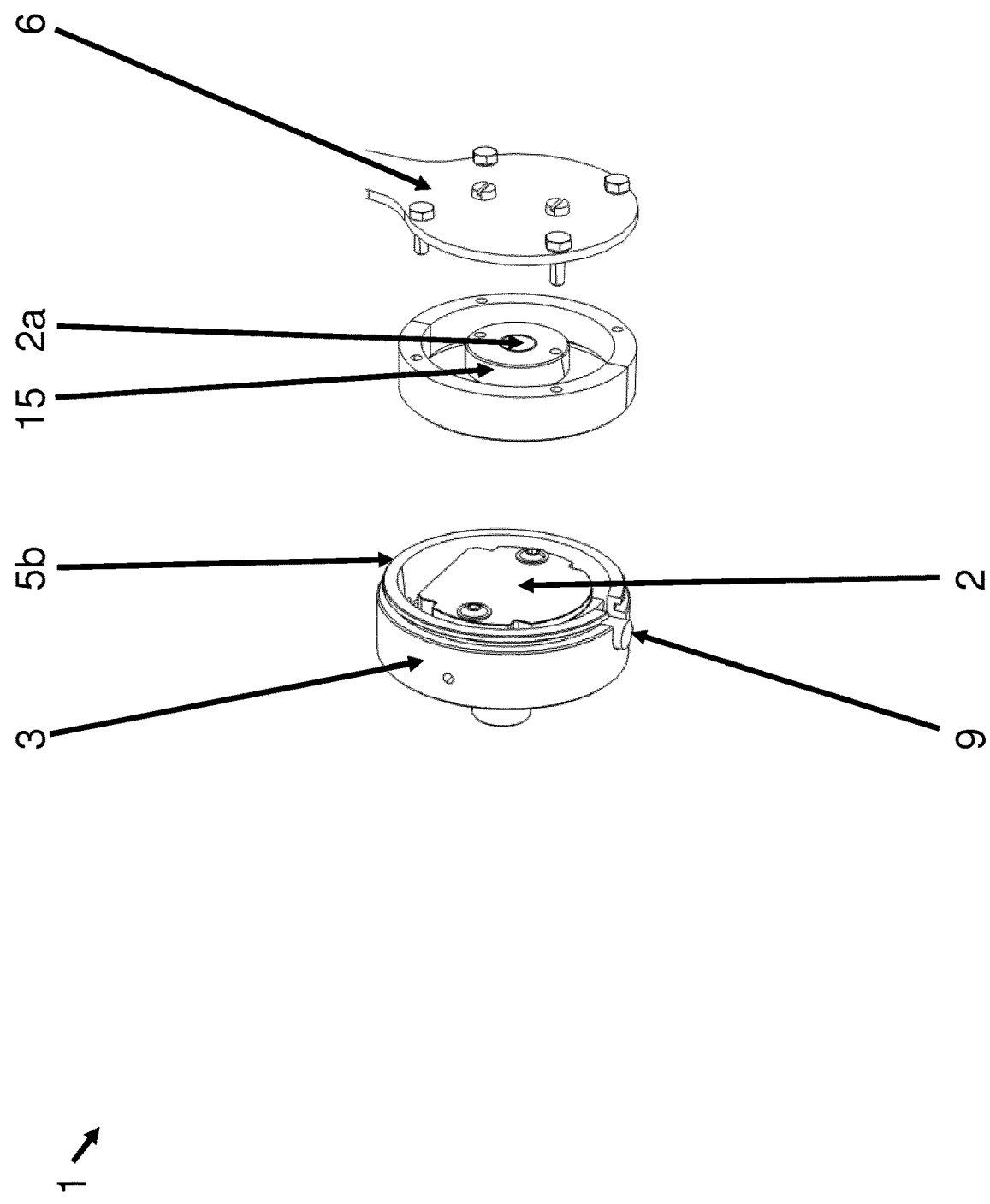

Further features, details and advantages of the invention can be found from the following description and with reference to the drawings. Embodiments of the invention are shown in the following drawings merely schematically and will be described in greater detail in the following. Mutually corresponding objects or elements are provided with the same reference signs in all the figures. In the drawings:

FIG. 1: shows a retaining system according to the invention,

FIG. 2: is an exploded view of the retaining system according to the invention, comprising pivot bolts, FIG. 3a: shows a driver pin according to the invention, FIG. 3b: shows a driver lever according to the invention, FIG. 4a: shows a retaining element part according to the invention, FIG. 4b: shows a retaining element part according to the invention, FIG. 4c: shows a retaining element part according to the invention, FIG. 5a: shows a retaining element according to the invention, FIG. 5b: shows a retaining element according to the invention, FIG. 5c: shows a retaining element according to the invention, FIG. 6a: is a cross section of a retaining system according to the invention, FIG. 6b: is a detailed cross section of a retaining system according to the invention, FIG. 7: shows a work machine according to the invention, FIG. 8: shows a retaining system according to the invention on the bogie and mast segment of the work machine, FIG. 9: shows a retaining system according to the invention on the mast segment of the work machine, FIG. 10: shows a retaining system according to the invention on the chassis and supporting side arm of the work machine, FIG. 11a: is a detail view of a retaining system according to the invention on the chassis and supporting side arm of the work machine, FIG. 11b: is a detail view of a retaining system according to the invention on the chassis and supporting side arm of the work machine, FIG. 12a, b, c: show an alternative embodiment of a retaining system according to the invention, FIG. 13: shows an alternative embodiment of a retaining system according to the invention, FIG. 14: is an exploded view of a retaining system according to the invention, FIG. 15: is a detailed view of a retaining system according to the invention.

A retaining system 1 according to the invention is shown purely schematically in the figures and denoted by reference sign 1. The drawing according to FIG. 1 shows that the retaining system 1 comprises a retaining element part 3c designed as a cover on the retaining element 3 shown, wherein a driver lever 6 is arranged on said retaining element part 3c and is rotationally fixed to the retaining element 3. As a result, the rotational movements introduced via the driver pin 7 guided in the slot 8 of the driver lever 6 can be transferred to the retaining element 3. The driver pin 7 can be coupled to one of the two machine parts 102, 103a, 103b, 103c, 105, 106a, 106b, 109, 110, 111 that perform a rotational movement, by means of the driver pin 7 being fastened to the machine part 102, 103a, 103b, 103c, 105, 106a, 106b, 109, 110, 111, 113 by means of the fastening element 12 shown. Spacings between the retaining element 3 and the fastening element 12, which spacings change as a result of the rotational movement of the machine parts 102, 103a, 103b, 103c, 105, 106a, 106b, 109, 110, 111, 113 relative to one another, can be compensated by means of guiding the driver pin 7 in the slot 8 of the driver lever 6.

FIG. 2 is an exploded view of a retaining system 1 according to the invention. The retaining system 1 comprises a first retaining element 3 for coupling to a first machine part 102, 103a, 103b, 103c, 105, 109, 110, 111, wherein the retaining element 3 comprises a rotation angle sensor 2 of a rotation angle sensor assembly. The retaining element 3 consists of two retaining element parts 3a, 3b (see FIGS. 4a and 4b) which can be arranged on the other retaining element 4 of the retaining system 1 and surround the last retaining element in an interlocking manner. Said second retaining element 4 is designed for coupling to a second machine part 102, 103a, 103b, 103c, 106a, 106b, 109, 110, 111, 113. The retaining elements 3, 4 can be formed of aluminum or plastics material for example. In the case shown here, the second machine part 113 is indicated by a pivot bolt 113. The second retaining element 4 comprises a position encoder element 2a of the rotation angle sensor assembly that corresponds to the rotation angle sensor 2 and is preferably firmly adhesively bonded in the second retaining element 4. The position encoder element 2a may be a magnet. In this case, the rotation angle sensor 2 is preferably designed as a Hall sensor, so as to detect a rotation of the position encoder element 2*a* relative to the first retaining element 3. The rotation angle sensor 2 can also be designed differently, however. The rotation angle sensor 2 preferably performs the detection in a contactless manner, such that the rotation angle sensor assembly 2, 2*a* is not subject to any notable wear. The rotation angle sensor 2 is firmly screwed to a retaining element part 3*c* designed as a cover, which part is in turn screwed to the circular retaining element 3. In order to detect signals of the rotation angle sensor 2, the rotation angle sensor 2 comprises a signal cable 9 at the output, which cable is guided out of the retaining element 3 via cable passages 10. The driver lever 6 already described in FIG. 1 is screwed to the cover 3*c* of the retaining element 3.

FIG. 3*a* shows the driver pin 7 from FIG. 1 once again, in greater detail. In addition to the fastening element 12 for coupling to a machine part 102, 103*a*, 103*b*, 103*c*, 105, 106*a*, 106*b*, 109, 110, 111, the driver pin 7 comprises a retaining plate 11 which ensures reliable guidance of the driver pin 7 in the slot 8 of the driver lever 6. Furthermore, an indentation 13 is shown in the center of the driver pin 7, which indentation allows for and facilitates handling of the driver pin 7, in particular screwing of the driver pin 7 into a machine part 102, 103*a*, 103*b*, 103*c*, 105, 106*a*, 106*b*, 109, 110, 111. The driver shaft 7 can also be formed in two parts, consisting of a threaded rod and a bushing comprising an machine part, wherein the threaded rod is screwed into the machine part 102, 103*a*, 103*c*, 105, 106*a*, 106*b*, 109, 110, 111, and the bushing, which guides the driver lever 6, is screwed onto the threaded rod, by means of the internal thread. As a result, the length of the driver pin 6 is variable, and the same driver pin 7 can be adjusted to various installation positions. In FIG. 3*b* shows the driver lever 6, comprising a slot 8 arranged therein for guiding the driver pin 7, in greater detail.

The driver lever 6 can also be provided with a simple hole instead of a slot 8. This is possible in particular if the sensor retaining element 4 is fastened centrally at the end of a pivot bolt 113, as shown in FIG. 2, such that the spacing form the driver pin 7 does not change during a rotational movement of the articulated joint. However, the slot 8 is in particular also advantageous in that structurally identical driver levers can be used for different installation positions.

The driver lever 6 can in addition be provided with a lug or the like, for guiding the cable 9 of the sensor 2. FIG. 4*a* shows the cover 3*c* of the first retaining element 3, already shown in FIGS. 1 and 2, in greater detail. It can be seen that the rotation angle sensor 2 is firmly screwed to the retaining element part 3*c*.

FIGS. 4*b* and 4*c* each show one retaining element part 3*a* and 3*b*, respectively, of the first retaining element 3. The two retaining element parts 3*a*, 3*b* are formed as semi-circular half shells and can be arranged on the second retaining element part 4 (FIG. 2) such that they surround said part in an interlocking manner. It is clear from both FIGS. 4*b* and 4*c* that the retaining element parts comprise a groove 5*a* as a guide 5 between the two retaining element parts 3, 4 (FIG. 2).

FIGS. 5*a*, 5*b* and 5*c* show the second retaining element 4 which comprises a fastening element 12 in the form of a threaded bolt for coupling to a machine part 102, 103*a*, 103*b*, 103*c*, 106*a*, 106*b*, 109, 110, 111, 113. The retaining element 4 furthermore comprises a projection 5*b* which can engage in the groove 5*a* of the guide 5, shown in FIGS. 4*b* and 4*c*, in accordance with the tongue-and-groove principle when the first retaining element 3 surrounds the second retaining element 4 in an interlocking manner, by means of the arrangement of the retaining element parts 3*a*, 3*a*.

Furthermore, the position encoder element 2*a* that corresponds to the rotation angle sensor 2 is indicated in FIG. 5*c*, which position encoder element is adhesively bonded in the central depression of the second retaining element 4. The second retaining element 4 may in addition be provided with two lateral width flats in order to be firmly screwed to the machine part 102, 103*a*, 103*b*, 103*c*, 106*a*, 106*b*, 109, 110, 111, 113 using a spanner.

For assembling the retaining system 1 according to FIGS. 1 to 11, firstly the grooves 5*a* of the two retaining element parts 3*a* and 3*b* are placed around the second retaining element 4, and then the two retaining element parts 3*a* and 3*b* are screwed to the cover 3*c*, which is already screwed to the rotation angle sensor 2, such that the elements 3*a*, 3*b*, 3*c* and 4, together with the rotation angle sensor 2 and the position encoder element 2*a*, form a preassembled, universally usable unit. A cross-sectional view through a coupled retaining system 1 can be seen in FIG. 6*a*, The first retaining element 3 of the retaining system 1 is coupled to a first machine part 103*a*, by means of the driver lever 6 and the driver pin 7 that is guided thereon. Said first machine part 103*a* is mounted so as to be rotatable about an articulated joint 104*a*, relative to a second machine part 102. A pivot bolt 113, to which the second retaining element 4 of the retaining system 1 is coupled, is rotationally fixed to said second machine part 102. A guide 5 is arranged between the first retaining element 3 and the second retaining element 4, which guide allows for rotation of the two retaining elements 3, 4 relative to one another. Said guide 5 is shown again in greater detail in the detail view according to FIG. 6*b*. It can be seen that the first retaining element 3 comprises a groove 5*a* as the guide, while the second retaining element 4 comprises, as the guide 5, a projection 5*b*, preferably in the form of a collar, that engages in the groove 5*a*. This ensures robust and reliable, but nonetheless smooth-running, guidance between the retaining elements 3, 4. The first retaining element 3 comprises the rotation angle sensor 2 of the rotation angle sensor assembly. As can be seen, the rotation angle sensor 2 is firmly fastened, preferably screwed, to the retaining element part 3*c* designed as the cover. The second retaining element 4 comprises a position encoder element 2*a* of the rotation angle sensor assembly that corresponds to the rotation angle sensor 2. The position encoder element 2*a* is preferably adhesively bonded in the second retaining element part 4. The rotation angle sensor 2 is designed so as to detect a rotation of the position encoder element 2*a* relative to the rotation angle sensor 2. The guide between the first retaining element part 3 and second retaining element part 4 guides the rotation angle sensor 2 in the first retaining element part 3 so as to be rotatable relative to the position encoder element 2*a* on the second retaining element part 4. As can be seen, the guide 5 that is designed in this way makes it possible to ensure in particular the axial orientation, but also the spacing, as well as the parallelism of the rotation angle sensor 2 and of the position encoder element 2*a*, using the first retaining element 3 and the second retaining element 4.

FIG. 7 shows, by way of example, a work machine 100 according to the invention in the form of an auto concrete pump comprising a distribution mast 101. The work machine 100 comprises a fold-out articulated mast 101 that comprises a bogie 102, which is rotatable about a vertical axis, and a plurality of mast segments 103*a*, 103*b*, 103*c*. The mast segments 103*a*, 103*b*, 103*c* are in each case pivotably connected to the respectively adjacent mast segment 103*a*, 103*b*, 103*c* or the bogie 102, by means of articulated joints 104*a*, 104*b*, 104*c*. In order to introduce a pivot movement between the mast segments 103a, 103b, 103c or the bogie 102, the articulated mast 101 comprises drive units in the form of hydraulic cylinders 109. The hydraulic cylinders 109 are hinged to the mast segments 103a, 103b, 103c or the bogie 102 by means of hinge points 108 and connected to coupling members 110, 111 in the form of push bars 110 and deflection levers 111. The bogie 102 of the articulated mast 102 is rotatably connected to the chassis 105 of the work machine 100. The tilting moment generated by folding out and moving the articulated mast 101 is braced by the chassis 105 on a footprint that is enlarged by means of supporting side arms 106a, 106b. For this purpose, the chassis 105 comprises a plurality of supporting side arms 106a, 106b which can be folded out, fully or in part, into a support position, from a travel position in which the supporting side arms 106a, 106b to not protrude beyond the external dimensions of the chassis 105. In the embodiment shown in FIG. 7, the supporting side arm 106a is arranged on the chassis 105 so as to be able to be folded out about the articulated joint 107 and is shown when folded out. In this position, the supporting side arm 106a supports the work machine. A thick matter pump 112 that acts as a concrete pump is arranged in the rear region of the work machine 100 that is designed as a vehicle. Via said thick matter pump 112, concrete can be delivered along the folded-out articulated mast 101, through delivery lines (not shown), and distributed at the mast end by means of mast movements of the articulated mast 101.

FIG. 8 is a detail view and shows a retaining system 1 which is arranged in the region of the articulated joint 104a between the bogie 102 and the first mast segment 103a of the articulated mast 101 according to FIG. 7. The driver pin 7 is firmly connected to the first mast segment 103a, such that the driver lever 6 and the first retaining element 3 are coupled to the mast segment 103a. The joint 104a shown here has already been described in greater detail with reference to the cross-sectional view in FIGS. 6a and 6b. By way of example, the first mast segment 103a forms the first machine part 103a, which is coupled to the first retaining element 3. At the same time, by way of example, the bogie 102 forms the second machine part 102, to which the second retaining element 4 is coupled. As already noted with regard to FIG. 6a, the pivot bolt 113 is rotationally fixed to the bogie 102. As a result, pivoting of the first mast segment 103a relative to the bogie 102 causes a rotational movement of the first retaining element 3 relative to the second retaining element 4 that is coupled to the pivot bolt 113, Said rotational movement is detected by the rotation angle sensor assembly 2, 2a such that the rotation angle sensor 2 detects a rotation of the position encoder element 2a on the second retaining element 4. In the case of application shown here, the retaining system 1 is coupled such that the rotation angle sensor assembly 2, 2a directly detects the articulation angle between the bogie 102 and the first mast segment 103a.

FIG. 9 shows, by way of example, another possible use of the retaining system 1 on an articulated mast 101, Here, the articulated joint 104c between the second mast segment 103b and the third mast segment 103c is shown more clearly. The retaining system 1 is arranged on a hinge point 108 of the deflection lever 111, on the second mast segment 103b. The retaining system 1 is coupled such that the rotation angle sensor assembly 2, 2a directly detects the articulation angle between the deflection lever 111 and the mast segment 103b. The absolute articulation angle between the two mast segments 103b, 103c in the articulated joint 104c is converted from said detected articulation angle, in order to determine the position of the two mast segments 103b, 103c relative to one another. Arranging the retaining system 1 on the hinge point 108 of the deflection lever 111 makes it possible to guide a concrete delivery line (not shown) through the articulated joint 104c, between the two mast segments 103b, 103c. The first retaining element 3 is coupled to the rotation angle sensor 2 on the second mast segment 103b of the articulated mast 101 by means of the driver pin 7 and the driver lever 6, while the second retaining element 4 comprising the position encoder element 2a is coupled to the deflection lever 111. As a result, the position of the two mast segments 103b, 103c can be determined in a simple and reliable manner by means of the rotation angle sensor assembly 2, 2a. The arrangement on the hinge point 108 is furthermore advantageous in that it is simple to guide the cable 9 for signal transmission from the rotation angle sensor 2 along the mast segment 103b.

FIG. 10 shows, by way of example, another possible use of the retaining system 1 on a work machine 100 according to FIG. 7. In the field of application shown here, the retaining system 1 is coupled to the supporting side arm 106a by the driver pin 7, via the driver lever 6, such that the first retaining element 3 comprising the rotation angle sensor 2 moves independently of the pivot movement of the supporting side arm 106a about the articulation axis formed by the articulated joint 107. In this case, the second retaining element 4 of the retaining system 1 is coupled to the chassis 105, such that the position encoder element 2a is rotationally fixed relative to the chassis 105. For this purpose, the retaining element 4 is retained on the chassis 105 on a retaining plate that has been welded on. If the supporting side arm 106a is pivoted, relative to the chassis 105, about the articulated joint 107 by means of the hydraulic cylinder 109, the rotation angle sensor 2 detects a rotation of the position encoder element 2a relative to the rotation angle sensor 2 and can thus provide information on the position of the supporting side arm 106a relative to the chassis 105. The pivot movement of the supporting side arm 106a relative to the chassis 105 leads to a change in the spacing of the driver pin 7 relative to the retaining element 3 which is, however, compensated by the slot 8 in the driver lever 6. This can also be seen in more detail from the detail views according to FIGS. 11a and 11b. It can also be seen, here, that the driver lever 7 and the cover 3c of the retaining element 3 are manufactured from a single piece.

Figure 12B:
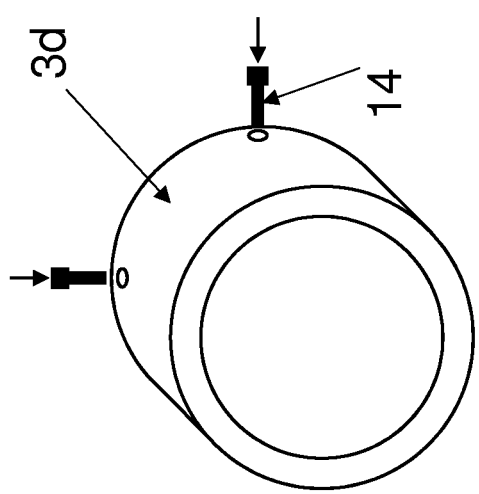
Figure 12C:
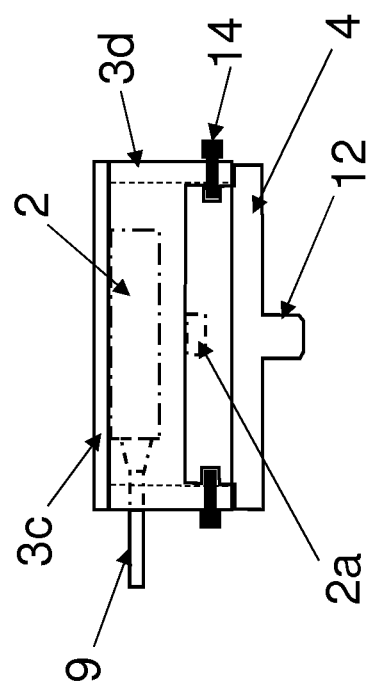

An alternative design of the retaining system 1 which is based on more simply designed components is shown in FIGS. 12a, 12b and 12c. In this case, instead of the two half shells 3a, 3b, a simply designed cylinder 3d without the groove 5a is used as the first retaining element. Two to four screws 14 form retaining pins that engage behind the projection 5b of the second retaining element 4 and are screwed into the cylinder 3d, for example in a manner limited by the screw heads, such that the cylinder 3d and the second retaining element 4 remain rotatable relative to one another. The cover 3c can be screwed to the cylinder 3d or the cylinder 3d and the cover 3c together form an integral first retaining element 3.

A further simplification could also be made possible by simple snap-fitting of the first retaining element 3 to the second retaining element 4 by means of a correspondingly designed tongue-and-groove arrangement 5a/5b, which optionally establishes a connection between the components that cannot be released in a non-destructive manner.

In the embodiments the rotation angle sensor 2 is connected to the first retaining element 3, and the position encoder element 2a is connected to the second retaining element 4. The installation positions of the rotation angle sensor 2 and of the position encoder element 2a can of course also be swapped with one another. Another rotation angle sensor means that operates in a contactless manner and that for example performs a radial measurement instead of an axial measurement, or a simple potentiometer, for rotation angle measurement, that is mounted in the retaining system 1 and is guided through a suitable driver in the interior of the retaining system 1, i.e. a sensor means that does not operate in a contactless manner, are conceivable as alternative embodiments in conjunction with the retaining system proposed here, FIG. 13 discloses an alternative embodiment of the retaining system 1. The drawing according to FIG. 13 shows that a driver lever 6 is arranged on the retaining element 4 shown, and is rotationally fixed to the retaining element 4. As a result, the rotational movements introduced via the driver pin 7 guided in the slot 8 of the driver lever 6 can be transferred to the retaining element 4. The driver pin 7 (FIG. 1) can be coupled to one of the two machine parts 102, 103a, 103b, 103c, 105, 106a, 106b, 109, 110, 111 that perform a rotational movement, by means of the driver pin 7 (FIG. 1) being fastened to the machine part 102, 103a, 103b, 103c, 105, 106a, 106b, 109, 110, 111, 113 by means of the fastening element 12 (FIG. 1). Spacings between the retaining element 4 and the fastening element 12 (FIG. 1), which spacings change as a result of the rotational movement of the machine parts 102, 103a, 103b, 103c, 105, 106a, 106b, 109, 110, 111, 113 relative to one another, can be compensated by means of guiding the driver pin 7 (FIG. 1) in the slot 8 of the driver lever 6. The further retaining element 3 comprises a fastening element 12 in the form of a threaded bolt for coupling to a machine part 102, 103a, 103b, 103c, 106a, 106b, 109, 110, 111, 113.

FIG. 14 shows an exploded view of the retaining system 1 according to FIG. 13. The retaining system 1 comprises a first retaining element 4 for coupling to a first machine part 102, 103a, 103b, 103c, 105, 109, 110, 111, wherein the retaining element 4 comprises a position encoder element 2a of the rotation angle sensor assembly that corresponds to the rotation angle sensor 2 and that is preferably screwed to the retaining element 4, in the retaining element 4, by means of a receiving ring 15. In the embodiment shown, the receiving ring 15 is screwed to the driver lever 6 that forms a cover in the region of the retaining element 4. The retaining element 4 is formed of two retaining element parts 4a, 4b which can be arranged on the other retaining element 3 of the retaining system 1 and surround the last retaining element 3 in an interlocking manner. The second retaining element 3 is designed for coupling to a second machine part 102, 103a, 103b, 103c, 106a, 106b, 109, 110, 111, 113. For this purpose, the retaining element 3 comprises a threaded bolt 12 which is clearly visible in FIG. 13. The cover of the driver lever 6 is screwed to the two retaining element parts 4, 4a of the retaining element 4. The position encoder element 2a can also be firmly screwed to a retaining element part designed as a cover, which part is in turn screwed to the circular retaining element 4. The position encoder element 2a may be a magnet. The retaining elements 3, 4 can be formed of aluminum or plastics material for example. The second retaining element 3 comprises the rotation angle sensor 2 of the rotation angle sensor assembly. The rotation angle sensor 2 is preferably designed as a Hall sensor, so as to detect a rotation of the magnetic position encoder element 2a relative to the first retaining element 4. The rotation angle sensor 2 preferably performs the detection in a contactless manner, such that the rotation angle sensor assembly 2, 2a is not subject to any notable wear. In order to detect signals of the rotation angle sensor 2, the rotation angle sensor 2 comprises a signal cable 9 at the output, which cable is guided out of the retaining element 3 via cable passages 10. It can furthermore be seen that the retaining element 3 comprises a projection 5b which can engage in the groove 5a of the guide 5 on the further retaining element 4, in accordance with the tongue-and-groove principle, when one retaining element 4 surrounds the other retaining element 3 in an interlocking manner, by means of the arrangement of two retaining element parts 4a, 4a. Furthermore, the position encoder element 2a that corresponds to the rotation angle sensor 2 is shown in FIG. 14, which position encoder element is fastened in a receiving ring 15 on the further retaining element 4.

FIG. 15 shows the position encoder 2a of the rotation angle sensor assembly, having the receiving ring 15 arranged in the first retaining element 4. The rotation angle sensor 2 of the rotation angle sensor assembly is arranged in the second retaining element 3, such that the signal cable 9 is guided through the cable passages 10. The embodiment of the retaining system 1 shown in FIGS. 13 to 15 is particularly suitable for arranging the retaining element 3 on a machine part 102, 103a, 103b, 103c, 106a, 106b, 109, 110, 111, 113 that is stationary relative to the further cable routing of the signal cable 9. The risk of the signal cable 9 being inadvertently pulled off is significantly reduced by this embodiment.

Of course, the invention is not limited to the embodiments and alternatives shown. Further embodiments are possible, without departing from the basic concept.

LIST OF REFERENCE SIGNS 1 retaining system
2 rotation angle sensor (rotation angle sensor assembly)
2a position encoder element (rotation angle sensor assembly)
3 first retaining element
3a first retaining element part
3b second retaining element part
3c cover
3d first retaining element part (alternatively cylindrical)
4 second retaining element
5 guide
5a groove
5b projection
6 driver lever
7 driver pin
8 slot
9 cable
10 cable passages
11 retaining plate
12 fastening means
13 indentation
14 screws
15 receiving ring
100 work machine
101 articulated mast
102 bogie
103a, 103b, 103c mast segments
104a, 104b, 104c articulated joints
105 chassis
106a, 106b supporting side arms
107 articulated joints
108 hinge point
109 hydraulic cylinder
110 push rod 111 deflection lever
112 thick matter pump
113 pivot bolt

The invention claimed is:

1. A retaining system for a rotation angle sensor assembly for retention on a work machine, the rotation angle sensor assembly configured to detect an articulation angle at an articulated joint between two machine parts, the retaining system comprising:
a first retaining element for coupling to a first of the two machine parts and comprising a rotation angle sensor of the rotation angle sensor assembly; and
a second retaining element for coupling to a second of the two machine parts and comprising at least one position encoder element of the rotation angle sensor assembly corresponding to the rotation angle sensor,
wherein the rotation angle sensor is configured to detect a rotation of the position encoder element relative to the rotation angle sensor,
wherein the first retaining element is configured to guide the rotation angle sensor via a guide formed between the first retaining element and the second retaining element so as to be rotatable relative to the position encoder element on the second retaining element,
wherein one of either the first or the second retaining elements comprises a groove as the guide, while the other of the first or the second retaining elements comprises at least one projection that engages in the groove,
wherein one of either the first or the second retaining elements comprises at least two retaining element parts interlocked to the other of the first or the second retaining elements.

2. The retaining system of claim 1, wherein the retaining element parts are half-shell shaped.

3. The retaining system of claim 1, wherein one of either the first or the second retaining elements is connected to a driver lever.

4. The retaining system of claim 3, wherein the driver lever comprises a slot.

5. The retaining system of claim 4, wherein a driver pin is guided in the slot on the driver lever, wherein the driver pin is configured to be coupled to one of the two machine parts.

6. The retaining system of claim 1, wherein the rotation angle sensor is configured to detect the rotation of the position encoder element relative to the rotation angle sensor in a contactless manner.

7. The retaining system of claim 6, wherein the rotation angle sensor comprises a Hall sensor, and the at least one corresponding position encoder element comprises a magnet.

8. A machine comprising:
a retaining system including:
a rotation angle sensor assembly including a rotation angle sensor and a position encoder element,
a first retaining element coupled to the rotation angle sensor, and
a second retaining element coupled to the position encoder element,
wherein the rotation angle sensor is configured to detect a rotation of the position encoder element relative to the rotation angle sensor,
wherein the first retaining element is configured to guide the rotation angle sensor via a guide formed between the first retaining element and the second retaining element so as to be rotatable relative to the position encoder element on the second retaining element,
wherein one of either the first or the second retaining elements comprises a groove as the guide, while the other of the first or the second retaining elements comprises at least one projection that engages in the groove,
wherein one of either the first or the second retaining elements comprises at least two retaining element parts interlocked to the other of the first or the second retaining elements.

9. The machine of claim 8, further comprising:
a fold-out articulated mast including:
a bogie that is rotatable about a vertical axis, and mast segments,
wherein each of the mast segments are pivotably connected to an adjacent mast segment or the bogie via articulated joints,
wherein the rotation angle sensor assembly is arranged to detect an articulation angle between two adjacent mast segments or between one mast segment and the bogie.

10. The machine of claim 8, further comprising:
a chassis; and
a plurality of supporting side arms which are each arranged on the chassis and can be folded out, via an articulated joint, from a travel position into a support position in which the supporting side arms are configured to support the machine, wherein the rotation angle sensor assembly is arranged to detect an articulation angle between a supporting side arm and the chassis.

11. The machine of claim 8, wherein the retaining system is positioned such that the rotation angle sensor assembly detects the articulation angle between two machine parts.

12. The machine of claim 8, wherein the retaining system is positioned such that the rotation angle sensor assembly is configured to detect an articulation angle at a hinge point to which kinematics elements are hinged, wherein the rotation angle sensor assembly is configured to convert an absolute articulation angle between two machine parts.

13. The machine of claim 12, wherein the kinematics elements comprise drive and coupling members selected from the group of a hydraulic cylinder, a push rod, and a deflection lever.

14. The machine of claim 8, further comprising:
a thick matter pump arranged on the machine.

* * * * *